D. E. VIRTUE.
CREAM RIPENER.
APPLICATION FILED MAY 8, 1912.

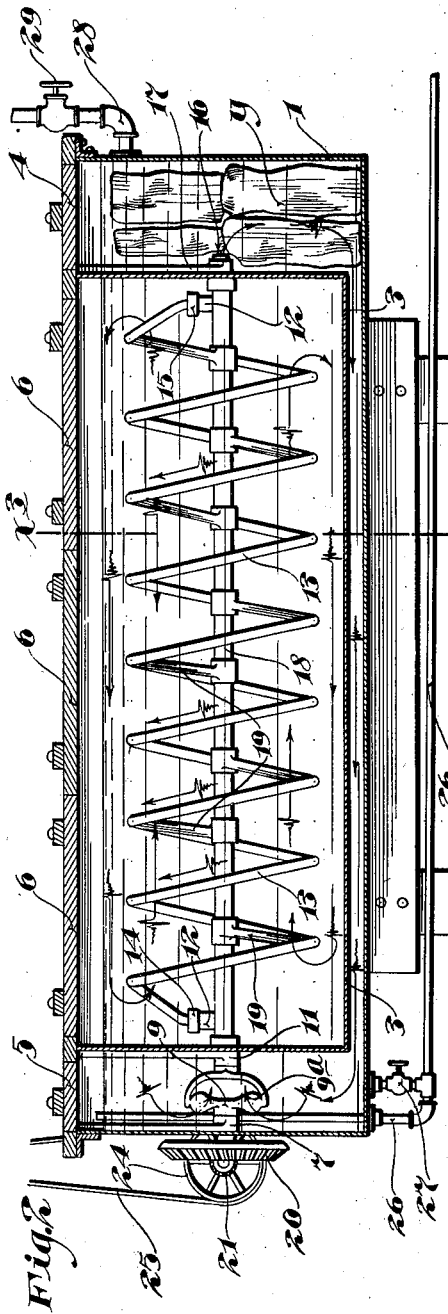

1,046,908.

Patented Dec. 10, 1912.
2 SHEETS—SHEET 2.

Witnesses:
E. G. Skinkle
Geo. Knutson

Inventor:
Dennis E. Virtue
By his Attorneys,
Williamson Merchant

UNITED STATES PATENT OFFICE.

DENNIS E. VIRTUE, OF OWATONNA, MINNESOTA.

CREAM-RIPENER.

1,046,908.　　　　Specification of Letters Patent.　　Patented Dec. 10, 1912.

Application filed May 8, 1912. Serial No. 695,904.

*To all whom it may concern:*

Be it known that I, DENNIS E. VIRTUE, a citizen of the United States, residing at Owatonna, in the county of Steele and State of Minnesota, have invented certain new and useful Improvements in Cream-Ripeners; and I do hereby declare the following to be a full, clear, and exact description of the invention, such as will enable others skilled in the art to which it appertains to make and use the same.

My invention has for its particular object, the provision of a generally improved and simplified cream ripener, and to such ends, the invention consists of the novel devices and combinations of devices hereinafter described and defined in the claims.

The use of cream ripeners in creameries is general and well understood. Particularly stated, they are used, at certain times, to reduce the temperature of the cream to an even low temperature, and, at other times, to bring the cream to an even and higher degree of temperature, in the preparation of the cream for churning.

In the accompanying drawings which illustrate the invention, like characters indicate like parts throughout the several views.

Figure 4:
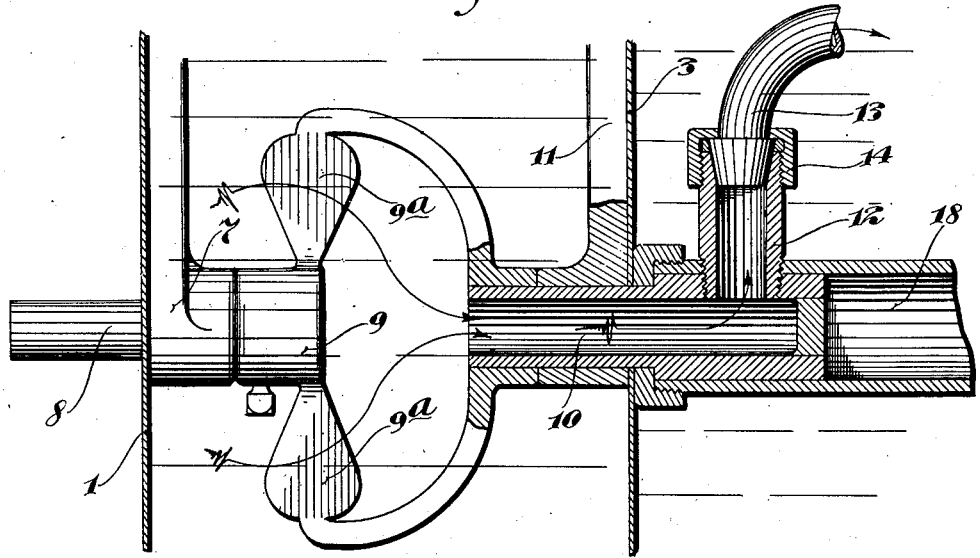
Figure 5:
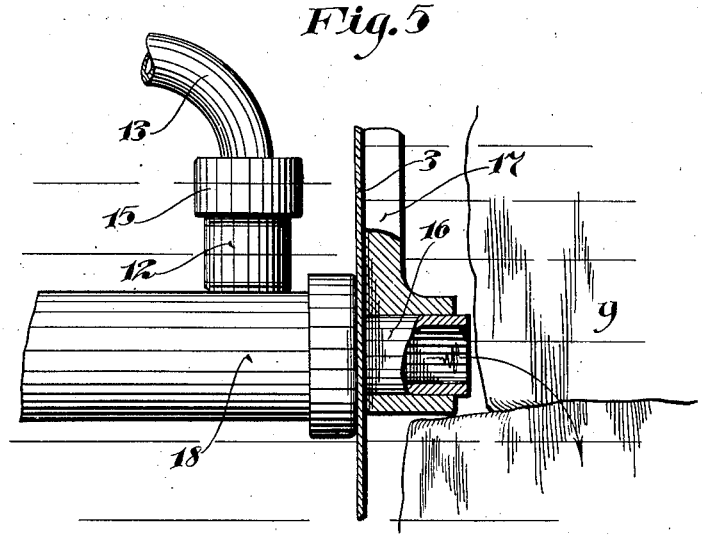

Referring to the drawings, Figure 1 is a view in end elevation showing the improved cream ripener; Fig. 2 is a longitudinal section taken on the line $x^2$ $x^2$ on Fig. 1; Fig. 3 is a transverse section taken on the line $x^3$ $x^3$ on Fig. 2; Fig. 4 is a vertical section taken axially through one end; and Fig. 5 is a similar view taken axially through the other end of the cream tank or vat, some parts being shown in full, and some parts being broken away.

The numeral 1 indicates a long horizontally disposed outer tank having a semicylindrical body, as shown, and supported on leg brackets 2. Located within the tank 1 is an inner tank 3, approximately the same shape, but smaller, both in longitudinal and vertical and transverse dimensions. This tank 2 is rigidly supported within the tank 1 in such a way that it is spaced from the end, sides and bottom portions thereof, thereby leaving a water jacket surrounding all but the top of the said inner tank. The space between the right hand ends of the tanks, as shown in Fig. 2, is quite large, and adapted to contain ice $y$. This ice chamber is provided with a removable cover 4. The chamber formed between the other ends of the said tanks is provided with a removable cover 5, and the inner tank 3 is provided with a removable cover section 6.

Extending through the left hand head of the outer tank 1 at the axis thereof, and journaled in a suitable bearing 7 on the said head, is a short shaft 8, the inner end of which, between the left hand heads of the two tanks 1 and 3, is provided with a stirrup-like coupling 9, that is secured to the projecting end of a tubular trunnion 10, that axially alines with the shaft 8 and is extended through and journaled in a bearing 11 on the left hand head of the inner tank 3. The inner end of the trunnion 10 is plugged and provided with a radially projecting nipple 12, to which one end of a coiled propeller pipe or tube 13 is detachably connected by a suitable coupling 14. The other end of this propeller coil 13 is connected by a coupling 15 to another hollow trunnion 16, which is like the trunnion 10 but is extended through and journaled in a bearing 17, secured to the opposite head, to-wit, as shown, to the right hand head of the inner tank 3. Preferably, an axial shaft 18 shown as in the form of a pipe extends through the coil 13, and at its ends is secured to the two axially alined hollow trunnions 10 and 16. Radial spokes 19 connect the intermediate portion of the shaft 18 to the intermediate coils of the propeller coil 13, and thus support the said coil so that it will maintain its porper spiral form under rotation.

To the outer end of the shaft 8 is secured a beveled gear 20, which, as shown, meshes with a pinion 21 on the inner end of a short shaft 22, journaled in suitable bearings on the adjacent head of the outer tank 1, and, as shown, provided with a loose pulley 23 and fixed pulley 24, over which a power driven belt 25 is arranged to run.

The propeller coil 13 should be driven in the direction of the arrows marked thereon in Fig. 2, and also in Fig. 3, and under rotation of the said coil in this direction, a propelling action is produced in a direction from the left toward the right, in respect to Fig. 2. The cream is, of course, placed in the inner tank 3, and the space in the outer tank surrounding the inner tank is nearly filled with water. Hence, under rotation of the spiral propeller in the direction stated, the cream will be thoroughly stirred and will be continuously circulated approximately as indicated by long longitudinal arrows marked on Fig. 2. The said propeller coil 13 will, of course, be kept full of the water which is contained within the outer tank, and under rotation of the said spiral in the direction stated, the water will be forced to flow through the said spiral from the left hand into the right hand end water chamber, and thence under the bottom around the sides of the inner or cream tank 3, and back to the left hand water chamber. The water, it will be seen, never leaves the interior of the main or outer tank, but is continuously circulated through the same and through the spiral conveyer, and when ice is placed in the said water or outer tank, it is circulated to and from the ice, thus maintaining its low temperature. The cream which is being cooled is cooled by circulation of water both around and through the same. To assist in the propelling or agitating action of the cream, the spokes 19 are preferably made flat and obliquely set, so that they act as propeller blades. To assist in circulating the water and introducing the same into the propelling coil or spiral 13, the stirrup-like head 9 is shown as provided with oblique propeller blades 9ª. (See particularly Fig. 4).

The numeral 26 indicates an overflow pipe which extends from a suitable point near the top of the tank 1, down through the bottom of the same, and to a suitable point of discharge. The numeral 27 indicates a valve-equipped drain pipe which connects the bottom of the tank 1 to the overflow pipe 26. This pipe 27 is, of course, normally closed.

The numeral 28 indicates a steam supply pipe which opens into one end of the tank 1 and is provided with a suitable valve 29.

Obviously, the apparatus may be used as a heater when the ice is removed from the water and steam is introduced into the pipe 28.

From a broad point of view, the apparatus described is a liquid tempering apparatus adapted for use to uniformly heat or uniformly cool cream or any other liquid. It is a self-contained apparatus in which all the parts for the circulation of the cooling or heating medium are located within the common or outer tank, or casing.

What I claim is:

1. In a liquid tempering apparatus, the combination with an outer tank and an inner tank spaced to afford a water jacket around said inner tank, of a rotary spiral conveyer within said inner tank having a conduit communicating with the opposite ends of said water jacket, the said spiral conveyer and water jacket constituting an endless conduit, through which the water is circulated over and over again, under the rotary action of said conveyer.

2. In a liquid tempering apparatus, the combination with an outer tank and an inner tank spaced to afford a water jacket around the sides, bottom and ends of said inner tank, hollow rotary trunnions journaled in the ends of said inner tank and communicating with the ends of said water tank, and a tubular spiral conveyer communicating with said trunnion and rotatable therewith within said inner tank, the said spiral conveyer and water jacket constituting an endless conduit, through which the water is circulated over and over again, under the rotary action of said conveyer.

3. In a liquid tempering apparatus, the combination with an outer tank and an inner tank spaced to afford a water jacket around the sides, bottom and ends of said inner tank, hollow rotary trunnions journaled in the ends of said inner tank and communicating with the ends of said water tank, a tubular spiral conveyer communicating with said trunnion and rotatable therewith within said inner tank, a shaft connected to and rotatable with said trunnions, and oblique radial spokes connecting said shaft to said tubular coil and acting as auxiliary propellers, the said spiral conveyer and water jacket constituting an endless conduit, through which the water is circulated over and over again, under the rotary action of said conveyer.

4. In a liquid tempering apparatus, the combination with an outer tank and an inner tank spaced to afford a water jacket around the sides, bottom and ends of said inner tank, hollow rotary trunnions journaled in the ends of said inner tank and communicating with the ends of said water tank, a tubular spiral conveyer communicating with said trunnion and rotatable therewith within said inner tank, and a stirrup-like coupling head connected to one of said hollow trunnions provided with propeller blades, and having a trunnion extended through the adjacent head of said outer tank, whereby said rotary parts may be driven from the exterior of said outer tank, the said spiral conveyer and water jacket constituting an endless conduit, through which the water is circulated over and over again, under the rotary action of said conveyer.

In testimony whereof I affix my signature in presence of two witnesses.

DENNIS E. VIRTUE.

Witnesses:
F. D. MERCHANT,
HARRY D. KILGORE.